Patented July 20, 1943

2,324,739

UNITED STATES PATENT OFFICE 2,324,739

ENAMEL COATING

William N. Stoops, Charleston, and Walter A. Denison, South Charleston, W. Va., assignors to Carbide and Carbon Chemicals Corporation, a corporation of New York No Drawing. Application September 22, 1939, Serial No. 296,040

12 Claims. (Cl. 174—125)

Diverse and exacting properties are needed in a coating material which is to be serviceable when applied as a baked enamel to wire and similar metallic articles.

In addition to having high dielectric strength, if the coating is also to serve as an electrical insulation, a suitable material must possess good adhesion to metals, particularly copper, and it must possess adequate flexibility so that the enamel film will not crack or break when the coated wire or article is bent. Furthermore, the coating must be hard and very resistant to abrasion and these qualities must be retained at temperatures of at least about 135° C. Likewise, at this temperature, the coating must resist thermal decomposition for prolonged periods and, at slightly lower temperatures of about 100° C., the coating must remain chemically stable for an indefinite period. Finally, the coating must be highly resistant to the action of hydrocarbon liquids at temperatures of about 100° C. and to the penetration of chemicals and water.

One of the objects of this invention is to provide a coating material which fulfills the above specifications more satisfactorily than the materials known at present. Another object is to provide generally an improved protective coating for metals.

By research, an artificial resin having outstanding excellence as an insulating and protective film when made into a baked enameled coating has been created. As the initial step in the preparation of such a resin, a monomeric vinyl compound of the structure R.CH:CH$_2$, where R may be an organic radical having at least one benzene ring, a lower aliphatic acyloxy group, or a halogen atom, is conjointly polymerized, preferably at a moderately elevated temperature and under catalytic influence, with an unsaturated dicarboxyl compound of the structure,

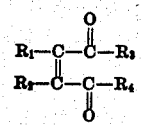

where either $R_1$ or $R_2$, or both, are hydrogen, a lower alkyl group, an aryl group, or an aralkyl group, and $R_3$ and $R_4$ are OH, or $R_3$ and $R_4$, taken together, are O, or $R_3$ is OH and $R_4$ is a lower oxyalkyl group. As catalysts there may be employed any material inducing polymerization, notably organic peroxides, such as dibenzoyl peroxide, acetyl benzoyl peroxide, or diacetyl peroxide.

Examples of monomeric vinyl compounds which are suitable for use in the above polymerization are styrene, vinyl naphthalene, methyl isopropenyl benzene, vinyl acetate, vinyl propionate, vinyl butyrate, vinyl chloride, and vinyl bromide. Examples of unsaturated dicarboxyl compounds which are suitable to be conjointly polymerized with the monomeric vinyl compounds are maleic anhydride, maleic acid, methyl maleic acid, dimethyl maleic acid, phenyl maleic acid, mono-methyl maleate and mono-ethyl maleate.

There results from this polymerization a thermoplastic resin which has at least one reactive carboxyl group per mol of combined unsaturated dicarboxyl compound. It is soluble in alkaline solutions and in many organic solvents. Resins of this character are acknowledged as part of the prior art.

The insulating and protective coating of this invention is prepared by applying to the metallic surface being coated a layer of the thermoplastic resin in which has been incorporated a polyalkylene glycol having at least three alkylene glycol units in the molecule. Such a layer with its incorporated higher polyalkylene glycol may conveniently be deposited on the metallic surface from a solution of the resin and the polyalkylene glycol.

The metallic surface with the layer of resin and polyalkylene glycol is then baked at an elevated temperature whereby the polyalkylene glycol is caused to react chemically with the carboxyl groups of the resin. As a result of this chemical reaction, a profound alteration in the properties of the once thermoplastic and soluble resin occurs. The resin is converted to a hard and adherent coating which is insoluble and infusible but which, nevertheless, is adequately flexible and which does not become brittle. The resistance of the coating to thermal decomposition and to the action of chemicals and water is excellent, and it generally fulfills the specifications set forth above.

The use of a polyalkylene glycol having at least three alkylene glycol units in the molecule is essential to our invention. Examples of such polyalkylene glycols are tri-, tetra-, penta-, hexa-, hepta, octaethylene and higher glycols; the corresponding polypropylene and polybutylene glycols; and mixed polyglycols, such as symmetrical diethylene dipropylene glycol. It has been found that the lower polyhydric alcohols, such as ethylene glycol or glycerine, or polymerized trihydric alcohols, such as polyglycerine, are entirely unsatisfactory to react with the thermoplastic resin to convert it to a baked enamel coating. Such compounds, when reacted, convert the thermoplastic resin to an insoluble form but the coating formed in this manner is very brittle, and it tends to crack or peel when metallic surfaces to which it has been applied are flexed or struck. Thus it is seen that the objects of this invention can be achieved only by the use of a reactant for the thermoplastic resin made up of a succession of oxyalkyl groups and having hydroxyl groups only in widely separated positions. It is possible that the use of such a compound gives rise to a flexible coating because of the internal plasticizing effect of the unbroken chain of oxyalkyl groups.

The invention will now be discussed with respect to several of its more specific embodiments and the examples to follow will illustrate these features more in detail.

It has been found that a resin formed by the conjoint polymerization of styrene with maleic anhydride is most suitable to employ as the thermoplastic resin to be reacted with the higher polyalkylene glycol to form the enamel coating. The conjoint polymer formed by this polymerization was generally observed to contain about 50% by weight of combined maleic anhydride.

Our experiments have also shown this thermoplastic resin desirably should be of such average molecular weight that the viscosity of a 12% solution of the resin in mesityl oxide is between about 14 and about 25 seconds measured at 20° C. in a Ford Cup viscosimeter with a No. 4 tip. Resins of appreciably lower molecular weight or viscosity give rise to somewhat brittle enamels whereas resins of higher degree of polymerization do not result in any very significant improvement in flexibility or film strength when the thermoplastic resin is reacted with the higher polyalkylene glycols.

Of these polyalkylene glycols, the use of hexaethylene glycol, or mixtures of polyethylene glycols ranging from tetra- to octaethylene glycol, but consisting mainly of hexaethylene glycol, has been found preferable. In conjunction with the higher polyalkylene glycols there may be employed a limited amount of high-boiling alcohol-ethers, such as the mono-phenyl ether of diethylene glycol or the benzyl ether of triethylene glycol. These alcohols should not be employed in amounts greater than about 50% for, otherwise, the resistance of the baked enamel to solvents is greatly diminished.

Of the examples to follow, the first two will illustrate the preparation of the soluble thermoplastic resin and the succeeding examples will show its conversion to the enamel coating of this invention.

Example 1

One part of styrene, one part of maleic anhydride and 0.02 part of dibenzoyl peroxide were added to three parts of acetone and the solution thus formed was heated with stirring at 65° C. for six hours. The reactants interpolymerized and the conjoint polymer formed was recovered from the resulting viscous solution by precipitation with methanol and it was found to contain approximately 50% maleic anhydride by weight. The yield of the conjoint polymer was 80%. The resin was insoluble in alcohol but soluble in ketones and in alkaline solutions. For instance, the resin may be readily dissolved in dilute or concentrated solutions of ammonia or of sodium hydroxide.

Example 2

One part of vinyl acetate, one part of maleic anhydride and 0.007 part of dibenzoyl peroxide were added to four parts of ethylene dichloride and the mixture thus formed heated with stirring at 75° C. for two hours. The reactants polymerized to make a conjoint polymer which was insoluble in ethylene dichloride and which precipitated as it formed. The conjoint polymer thus recovered amounted to 55% conversion of the monomers and was found to contain 49% maleic anhydride by weight.

Example 3

The resin formed in Example 1 was dissolved in a mixture of acetone and methyl isobutyl ketone, and triethylene glycol added to the extent of about 77% the weight of the resin. A film of the resin with the incorporated polyglycol was deposited from this solution on a copper sheet and baked for 10 minutes at 210° C. A clear, hard, enamel-like coating resulted which was insoluble and which did not soften when heated at 140° C. This coating was flexible and tough and could be bent and pounded without cracking. These qualities in the coating were retained even after an additional heat treatment of two weeks at 135° C. Its resistance to water and oil was good and the coating was admirably protective in all ways and particularly effective as an electrical insulation.

Example 4

The procedure outlined in the preceding example was followed with equally good results by substituting tetraethylene glycol for the triethylene glycol to an extent in this case, about equal to the weight of the resin.

Example 5

The resin formed in Example 2 was dissolved in a ketone solvent and an amount of tetraethylene glycol was added about equal to the weight of the resin. A film of resin and incorporated polyglycol was deposited from this solution on a copper panel and baked. An infusible and insoluble enamel-like coating resulted. It was similar in properties to the coating described in Example 3 with the exception that the resistance to water was somewhat less and the coating was not quite as flexible or as adherent to the metal after prolonged heating at 135° C.

Example 6

This example describes a composition particularly adapted to form an enamel-like electrical insulation on wire.

One part of a styrene-maleic anhydride conjointly polymerized resin, prepared as described in Example 1, and one part of hexaethylene glycol were dissolved in 7.5 parts of the acetate ester of the monoethyl ether of ethylene glycol, boiling at 156.2° C., and 1.5 parts of the acetate ester of the monoethyl ether of diethylene glycol, boiling at 218° C., to make a varnish which is suitable for application as a wire enamel.

Such a varnish is customarily applied by drawing the wire at high speed through a bath of the varnish and thereafter baking the coating at a relatively high temperature. In such operations, it is sometimes desirable to use moderately high boiling solvents in the bath to prevent excessive evaporation of the solvent as the wire leaves the bath and to avoid too rapid evaporation during baking. As solvents may be used, in addition to those mentioned above, furfural, boiling at 161.7° C., ethylene-glycol diacetate, boiling at 190° C., acetonyl acetone, boiling at 192° C., or mixtures of any of the foregoing with mesityl oxide. However, the use of high-boiling solvents is not essential since a solvent mixture composed of 3 parts of xylene and 2 parts of ethylene glycol monoethyl ether has given very satisfactory results.

The varnish described above was applied to a No. 16 copper wire by drawing the wire through a bath of the varnish at a rate of 15 feet per minute. The coated wire was then passed continuously through a baking oven about 12 feet long maintained at a temperature of about 455° C. Four successive coats were applied to the wire in this manner to build up an insoluble and infusible insulation about 0.0008 inch thick.

The insulating coating thus formed was extremely tough and flexible with excellent resistance to abrasion. For instance, the wire could be stretched to the breaking point without cracking the film except, of course, at the very point of rupture. It was also possible to wind the coated wire on the wire itself as a mandrel without breaking the enamel film. In addition, the coating did not decompose or become brittle on prolonged heating and it had excellent resistance to the action of ordinary solvents. For example, the coated wire was heated with mineral oils, xylene, and chlorinated aromatic hydrocarbons without damaging the enamel film.

*Example 7*

Since the styrene-maleic anhydride resin is soluble in aqueous alkaline solutions, it is sometimes desirable to deposit the film of resin with its incorporated higher polyglycol from an aqueous solution of a volatile alkali. To effect this, the following solution was prepared:

| | Parts |
|---|---|
| Styrene-maleic anhydride resin | 1 |
| Hexaethylene glycol | 1 |
| Ammonia solution (2.0% by weight in water) | 10 |

This composition was applied to a No. 16 copper wire by drawing the wire through the varnish at the rate of 7 feet per minute. The wire then was passed through a baking tower about 13 feet long maintained at a temperature of 348° C. Four coats were applied in this manner to form a hard, flexible, insoluble, and infusible enamel film having a thickness of 0.0013 inch. At somewhat higher rates of travel of the wire assembly, foaming may be encountered in the varnish bath resulting in an uneven coat of enamel. This can be prevented by adding to the bath small amounts of anti-foaming agents, such as the butyl ether of diethylene glycol, octyl alcohol, and tetradecyl alcohol.

Other volatile alkaline materials besides ammonia may be used as solvating media in the aqueous resin solution and as examples may be mentioned butyl amine and morpholine. If ammonia is used in the aqueous resin solution, it is sometimes desirable to include in the bath a water-miscible high-boiling solvent, such as the mono-butyl ether of diethylene glycol or ethylene glycol diacetate.

Modifications of the invention other than as disclosed will be readily apparent to those skilled in the art and are included within the scope of the invention as defined in the appended claims.

We claim:
1. A coated metallic article in which the coating comprises an acid-reacting vinyl resin heat-treated in place with a higher polyalkylene glycol to produce a hard, flexible, tough and adherent coating, the hydroxyl groups in said polyalkylene glycol being separated by at least three alkylene radicals joined by oxygen atoms, and said acid-reacting vinyl resin being a conjoint polymer of a vinyl compound of the structure $R.CH=CH_2$, where R is a radical of the group consisting of halogen, organic radicals having at least one benzene ring, and aliphatic acyloxy radicals, with an unsaturated carboxyl compound of the structure,

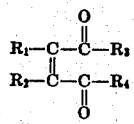

where $R_1$ and $R_2$ are radicals of the group consisting of hydrogen, lower alkyl, aryl and aralkyl, and $R_3$ and $R_4$ are radicals of the group consisting collectively of oxygen and individually of hydroxyl and lower oxyalkyl, $R_3$ being hydroxyl when $R_4$ is a lower oxyalkyl group.

2. An insulated electrical conductor in which the insulation comprises an acid-reacting vinyl resin heat-treated in place with a higher polyalkylene glycol to produce a hard, flexible, tough and adherent coating, the hydroxyl groups in said polyalkylene glycol being separated by at least three alkylene radicals joined by oxygen atoms, and said acid-reacting vinyl resin being a conjoint polymer of a vinyl compound of the structure $R.CH=CH_2$, where R is a radical of the group consisting of halogen, organic radicals having at least one benzene ring, and aliphatic acyloxy radicals, with an unsaturated carboxyl compound of the structure,

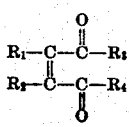

where $R_1$ and $R_2$ are radicals of the group consisting of hydrogen, lower alkyl, aryl and aralkyl, and $R_3$ and $R_4$ are radicals of the group consisting collectively of oxygen and individually of hydroxyl and lower oxyalkyl, $R_3$ being hydroxyl when $R_4$ is a lower oxyalkyl group.

3. An insulated copper wire in which the insulation comprises an acid-reacting vinyl resin heat-treated in place with a higher polyalkylene glycol to produce a hard, flexible, tough and adherent coating, the hydroxyl groups of said polyalkylene glycol being separated by at least three alkylene radicals joined by oxygen atoms, and said acid-reacting vinyl resin being a conjoint polymer of a vinyl compound of the structure $R.CH=CH_2$, where R is a radical of the group consisting of halogen, organic radicals having at least one benzene ring, and aliphatic acyloxy radicals, with an unsaturated carboxyl compound of the structure,

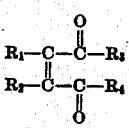

where $R_1$ and $R_2$ are radicals of the group consisting of hydrogen, lower alkyl, aryl and aralkyl, and $R_3$ and $R_4$ are radicals of the group consisting collectively of oxygen and individually of hydroxyl and lower oxyalkyl, $R_3$ being hydroxyl when $R_4$ is a lower oxyalkyl group.

4. A coated metallic article in which the coating comprises a conjoint polymer of styrene with maleic anhydride heat-treated in place with a higher polyalkylene glycol to produce a hard, flexible, tough and adherent coating, said polyalkylene glycol having its hydroxyl groups separated by at least three alkylene radicals joined by oxygen atoms.

5. A coated metallic article in which the coating comprises a conjoint polymer of styrene with maleic anhydride heat-treated in place with a mixture of polyethylene glycols to produce a hard, flexible, tough and adherent coating, the polyethylene glycols in said mixture having their hydroxyl groups separated by at least four ethylene radicals joined by oxygen atoms.

6. An insulated copper wire in which the insulation comprises a conjoint polymer of styrene with maleic anhydride heat-treated in place with hexaethylene glycol to produce a hard, flexible, tough and adherent insulation.

7. An insulated copper wire in which the insulation comprises a conjoint polymer of styrene with maleic anhydride heat-treated in place with hexaethylene glycol to produce a hard, flexible, tough and adherent insulation, said conjoint polymer being of such molecular weight that the viscosity of a 12% solution of the polymer in mesityl oxide is at least 14 seconds measured at 20° C. in a Ford Cup viscosimeter with a No. 4 tip.

8. A liquid wire enamel adapted to form a hard, tough, flexible and adherent coating on wire when baked thereon comprising a volatile solvent, an unreacted higher polyalkylene glycol in which the hydroxyl groups are separated by at least three alkylene radicals joined by oxygen atoms, and a conjoint polymer of styrene and maleic anhydride.

9. A wire enamel comprising a volatile solvent, a conjoint polymer of styrene and maleic anhydride, and unreacted hexaethylene glycol.

10. Process for making a hard, tough, flexible and adherent enamel which comprises depositing on a metal surface a film comprising a higher polyalkylene glycol, in which the hydroxyl groups are separated by at least three alkylene radicals joined by oxygen atoms, said glycol being incorporated in solution with a resin resulting from the conjoint polymerization of a vinyl compound of the structure $R.CH=CH_2$, where R is a radical of the group consisting of halogen, organic radicals having at least one benzene ring, and aliphatic acyloxy radicals, with an unsaturated carboxyl compound of the structure,

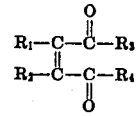

where $R_1$ and $R_2$ are radicals of the group consisting of hydrogen, lower alkyl, aryl, and aralkyl, and $R_3$ and $R_4$ are radicals of the group consisting collectively of oxygen and individually of hydroxyl and lower oxyalkyl, $R_3$ being hydroxyl when $R_4$ is a lower oxyalkyl group, and thereafter heating said film and causing said polyalkylene glycol to react with said resin to form said enamel.

11. Process for making a hard, tough, flexible and adherent enamel which comprises applying to a metal surface a film comprising a resin resulting from the conjoint polymerization of styrene with maleic anhydride, said resin being incorporated in solution with a higher polyalkylene glycol, in which the hydroxyl groups are separated by at least three alkylene radicals joined by oxygen atoms, and thereafter heating said film and causing said polyalkylene glycol to react with said resin to form said enamel.

12. Process for making a hard, tough, flexible and adherent electrical insulation on copper wire which comprises coating said wire with a film comprising a resin resulting from the conjoint polymerization of styrene with maleic anhydride, said resin being incorporated in solution with hexaethylene glycol, and thereafter baking said coating at an elevated temperature and causing said hexaethylene glycol to react with said resin to form said electrical insulation.

WILLIAM N. STOOPS.
WALTER A. DENISON.